(12) United States Patent
Ebey et al.

(10) Patent No.: US 6,267,357 B1
(45) Date of Patent: Jul. 31, 2001

(54) DROP FOOT JACK

(75) Inventors: Edward Wayne Ebey; Robert Edward Proudfoot, both of Wausau, WI (US)

(73) Assignee: Fulton Performance Products, Inc., Mosinee, WI (US)

( * ) Notice: Subject to any disclaimer, the term of this patent is extended or adjusted under 35 U.S.C. 154(b) by 0 days.

(21) Appl. No.: 09/501,693

(22) Filed: Feb. 10, 2000

(51) Int. Cl.$^7$ ........................................ B60S 9/02
(52) U.S. Cl. ............................................ 254/419
(58) Field of Search .................... 254/418, 419, 254/420, 424, 425, 98, 100; 184/6.14

(56) References Cited

U.S. PATENT DOCUMENTS

| | | |
|---|---|---|
| 2,687,268 | 8/1954 | Hawes . |
| 2,867,409 | 1/1959 | Southerwick . |
| 2,974,490 | 3/1961 | Hott . |
| 3,489,395 * | 1/1970 | Glassmeyer ........................... 254/419 |
| 3,647,183 | 3/1972 | Rishovd . |
| 4,066,243 | 1/1978 | Johnson . |
| 4,176,824 | 12/1979 | Linton et al. . |
| 4,624,447 | 11/1986 | Richmeier . |
| 5,174,550 * | 12/1992 | Pittman ................................ 254/420 |
| 5,423,518 * | 6/1995 | Baxter et al. ......................... 254/419 |
| 5,664,796 * | 9/1997 | Huzyers ............................... 254/418 |
| 5,904,342 | 5/1999 | Laarman . |

* cited by examiner

Primary Examiner—Robert C. Watson
(74) Attorney, Agent, or Firm—Craig A. Fieschko, Esq.; DeWitt Ross & Stevens SC

(57) ABSTRACT

This document describes a drop foot jack, also known as a vehicle landing gear or landing gear jack. A drop foot is telescopically borne within an inner sleeve, which is in turn telescopically borne within an outer sleeve. A rotatable screw is situated within the outer sleeve, and it engages the top surface of the inner sleeve so that rotation of the screw will move the outer sleeve and inner sleeve with respect to each other. The drop foot, inner sleeve, and outer sleeve preferably each have a circumference having multiple discrete sides, e.g., each may have a polygonal cross-section. Apertures are spaced along the lengths of the drop foot and the inner sleeve, and a latch plate having a generally planar configuration which can be selectively moved into aligned apertures in the inner sleeve and the drop foot to thereby engage the drop foot with respect to the inner sleeve. The plane of the latch plate is situated generally perpendicular to the lengthwise axes of the inner sleeve and drop foot, thereby enhancing the surface area of the latch plate that contacts the drop foot and inner sleeve; as a result, the shear strength (and load capacity) of the jack is increased. When the latch plate is inserted in the inner sleeve and drop foot, it engages two or more adjacent sides of the drop foot and the inner sleeve, thereby helping to avoid canting of the drop foot with respect to the inner sleeve. The outer sleeve includes a lubrication passage extending between its exterior and its interior, and the top surface of the inner sleeve has a depressed area adjacent the screw. The lubrication passage allows lubricant injected from the exterior of the outer sleeve to access the depression, whereby lubricant may pool in the depression to maintain the screw in a lubricated state.

23 Claims, 4 Drawing Sheets

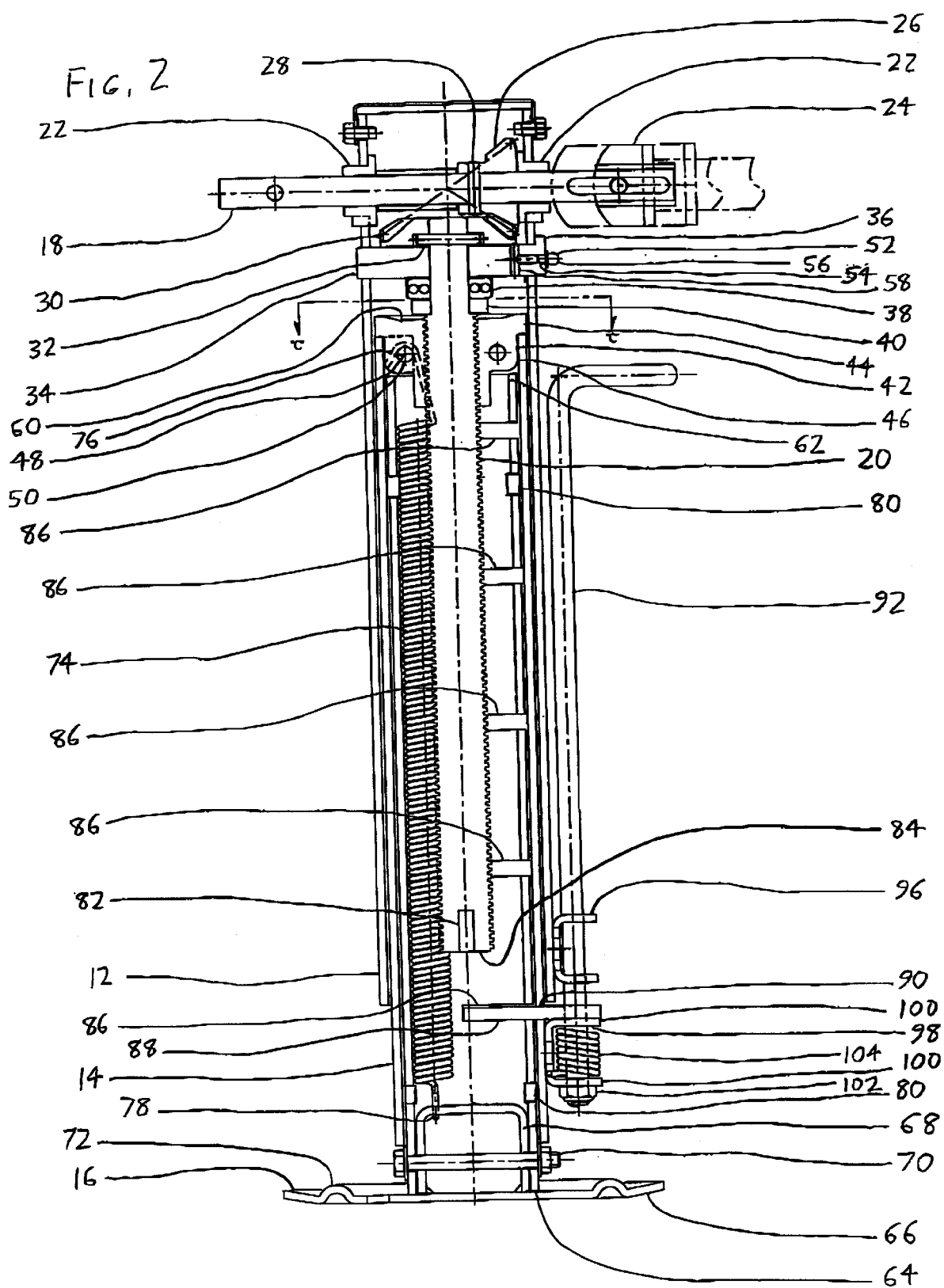

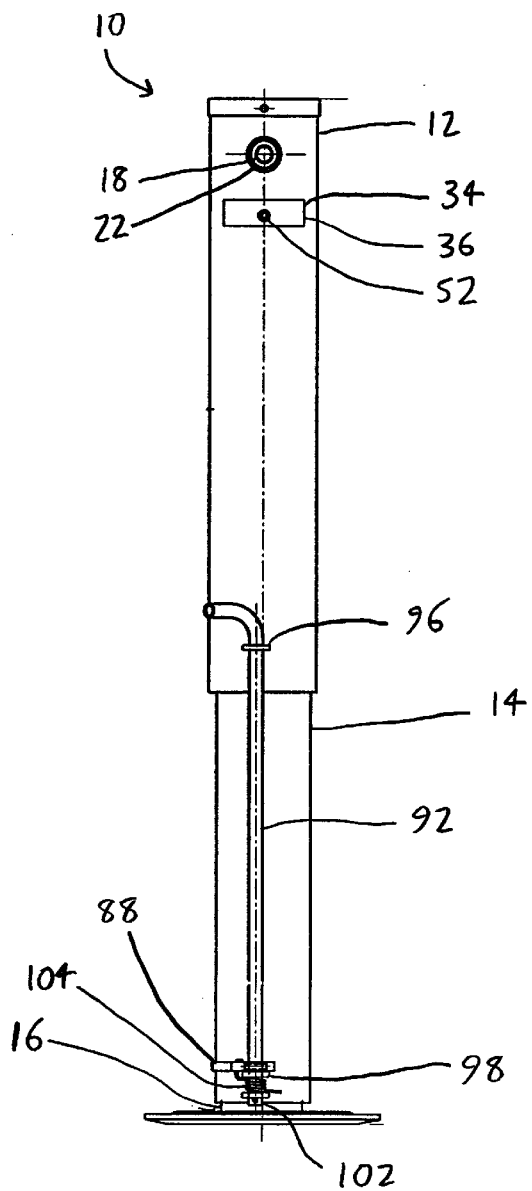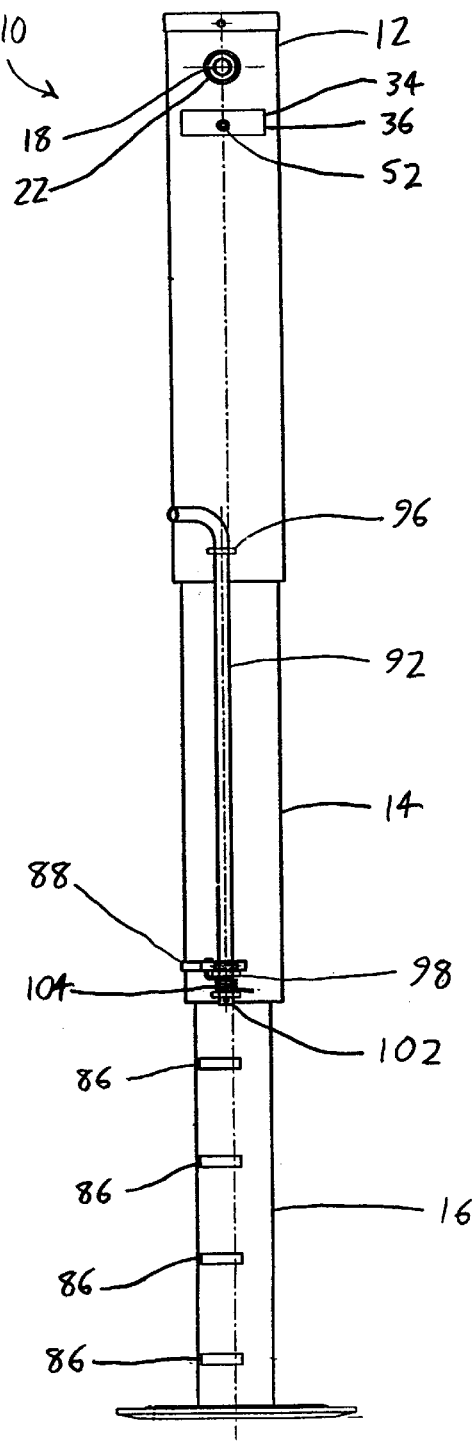

DROP FOOT JACK

FIELD OF THE INVENTION

This disclosure concerns an invention relating generally to apparata such as jacks for lifting and suspending vehicles, trailers, and other large objects, and more specifically to drop foot jacks (also known as landing gear jacks or vehicle landing gear).

BACKGROUND OF THE INVENTION

Drop foot jacks (also known as vehicle landing gear or landing gear jacks) are commonly used to lift and suspend vehicles, trailers, and other large bodies into elevated positions, with examples of such jacks being illustrated in U.S. Pat. No. 5,904,342 to Laarman and U.S. Pat. No. 5,423,518 to Baxter et al. Brief descriptions of these jacks will now be described so that the reader may better understand the structure and function of drop foot jacks.

U.S. Pat. No. 5,904,342 to Laarman illustrates a drop foot jack wherein an elongated drop foot is telescopically borne within an elongated sleeve, and a crank mechanism is interposed between the drop foot and sleeve so that winding a crank will cause the drop foot to extend from or retract within the sleeve. As a result, when the sleeve engages a trailer (or other object to be lifted) with the drop foot engaging the ground, rotating the crank allows the drop foot to raise or lower the trailer.

U.S. Pat. No. 5,423,518 to Baxter et al. illustrates a drop foot jack similar to that of Laarman, but wherein a potentially greater range of extension is allowed. As in Laarman, an elongated drop foot is telescopically borne within an elongated sleeve, but this sleeve is provided as an inner sleeve which is itself telescopically situated within an outer sleeve. A crank-driven screw engages the inner and outer sleeves so that they may be extended and retracted with respect to each other. Further, the drop foot may be extended or retracted within the inner sleeve, and apertures on the inner sleeve and drop foot may be aligned to allow pins to be inserted to engage the inner sleeve and drop foot together. Thus, a user may extend the drop foot with respect to the inner sleeve to some desired length and then engage them together, and may then crank the inner sleeve with respect to the outer sleeve to attain further height adjustment.

Several problems are perceived as being common in prior drop foot jacks. One significant problem is that in multistage drop foot jacks (i.e., those having multiple extending sections, as in Baxter), the mechanisms provided for locking the drop foot to the inner sleeve can provide less than optimal results. These mechanisms must often be compact owing to the telescoping arrangement of the drop foot jack and the need for easy engagement and disengagement, but a compact design tends to cause weakness insofar as pins (or other structure) bridging the inner sleeve and drop foot are subject to shear failure. As a result, the locking mechanism tends to impose the primary limitation on the jack's load capacity. Another significant problem is that drop foot jacks generally operate in harsh environments—they are exposed to road conditions, and therefore experience wide temperature variations and exposure to road grime, snow, salt, etc.—and they can therefore experience early failure. In large part, this arises owing to difficulties in keeping the moving parts of the jacks properly lubricated.

SUMMARY OF THE INVENTION

The invention, which is defined by the claims set out at the end of this disclosure, is directed to a drop foot jack which addresses the aforementioned problems (among others), and which provides numerous advantages which are not known to be present in prior drop foot jacks. While the drop foot jack can take any form defined by the claims, particularly preferred versions of the drop foot jack include at least one of the following features:

First, in versions wherein the drop foot is telescopically borne within an inner sleeve, locking of the drop foot with respect to the inner sleeve is performed by providing an inner sleeve aperture on the inner sleeve which may be aligned with one of several drop foot apertures spaced along the length of the drop foot, and then providing a latch plate having a generally planar configuration which can be selectively moved into aligned apertures in the inner sleeve and the drop foot. The plane of the latch plate is situated generally perpendicular to the lengthwise axes of the inner sleeve and drop foot, thereby increasing the contact area between the latch plate and the drop foot (as well as the latch plate and the inner sleeve). This provides the latch plate with higher resistance to shearing when the inner sleeve and drop foot are loaded, thereby greatly enhancing the load capacity of the drop foot jack.

Second, in versions wherein the drop foot is telescopically borne within an inner sleeve, the drop foot (and also preferably the inner sleeve) has a circumference with well-defined discrete sides, e.g., a polygonal circumference. For example, the drop foot may have a square or rectangular cross-section whereby it has four discrete sides. An inner sleeve aperture on the inner sleeve may be aligned with one of several drop foot apertures on the drop foot so that a latch may be selectively inserted within aligned apertures in the drop foot and the inner sleeve, thereby restraining them from relative movement. The drop foot apertures preferably extend across two or more adjacent sides of the drop foot so that when the latch is inserted in the inner sleeve and drop foot, it engages two or more adjacent sides of the drop foot. Since the latch extending between the inner sleeve and drop foot bears against the drop foot on multiple sides (i.e., in multiple planes), the drop foot is highly resistant to canting with respect to the inner sleeve; in other words, the drop foot and inner sleeve will remain locked together in their respective positions, and will not tip or rock about the latch with respect to each other. This increases the stability of the drop foot jack, as well as decreasing its shear susceptibility (and it thereby increases its loading capacity).

Third, the inner sleeve is preferably telescopically received within an outer sleeve. A rotatable screw extends within at least a portion of the interior of the outer sleeve, which includes a lubrication passage extending between its exterior and its interior. The inner sleeve has a top surface wherein the screw is rotatably received, whereby rotation of the screw will move the outer sleeve and inner sleeve with respect to each other. Additionally, the top surface of the inner sleeve has a depression adjacent the screw. The lubrication passage allows lubricant injected from the exterior of the outer sleeve to access the depression, whereby lubricant may pool in the depression to maintain the screw in a lubricated state. Most preferably, the lubrication passage is provided within an insert member which is inserted from the exterior of the outer sleeve to extend within its interior.

Further advantages, features, and objects of the invention will be apparent from the following detailed description of the invention in conjunction with the associated drawings.

BRIEF DESCRIPTION OF THE DRAWINGS

FIG. 2 is a side elevational view of a section of the drop foot trailer jack of FIG. 1, shown from the plane 2—2 in FIG. 1.

FIG. 3 is a front elevational view of the drop foot trailer jack of FIG. 1, shown with the inner sleeve 14 of the drop foot jack fully extended with respect to the outer sleeve 12 and with the drop foot 16 in a retracted state.

FIG. 4 is a front elevational view of the drop foot trailer jack of FIG. 1, shown with the inner sleeve 14 of the drop foot jack fully extended with respect to the outer sleeve 12 and with the drop foot 16 in an extended state.

DETAILED DESCRIPTION OF PREFERRED EMBODIMENTS OF THE INVENTION

Figure 1:
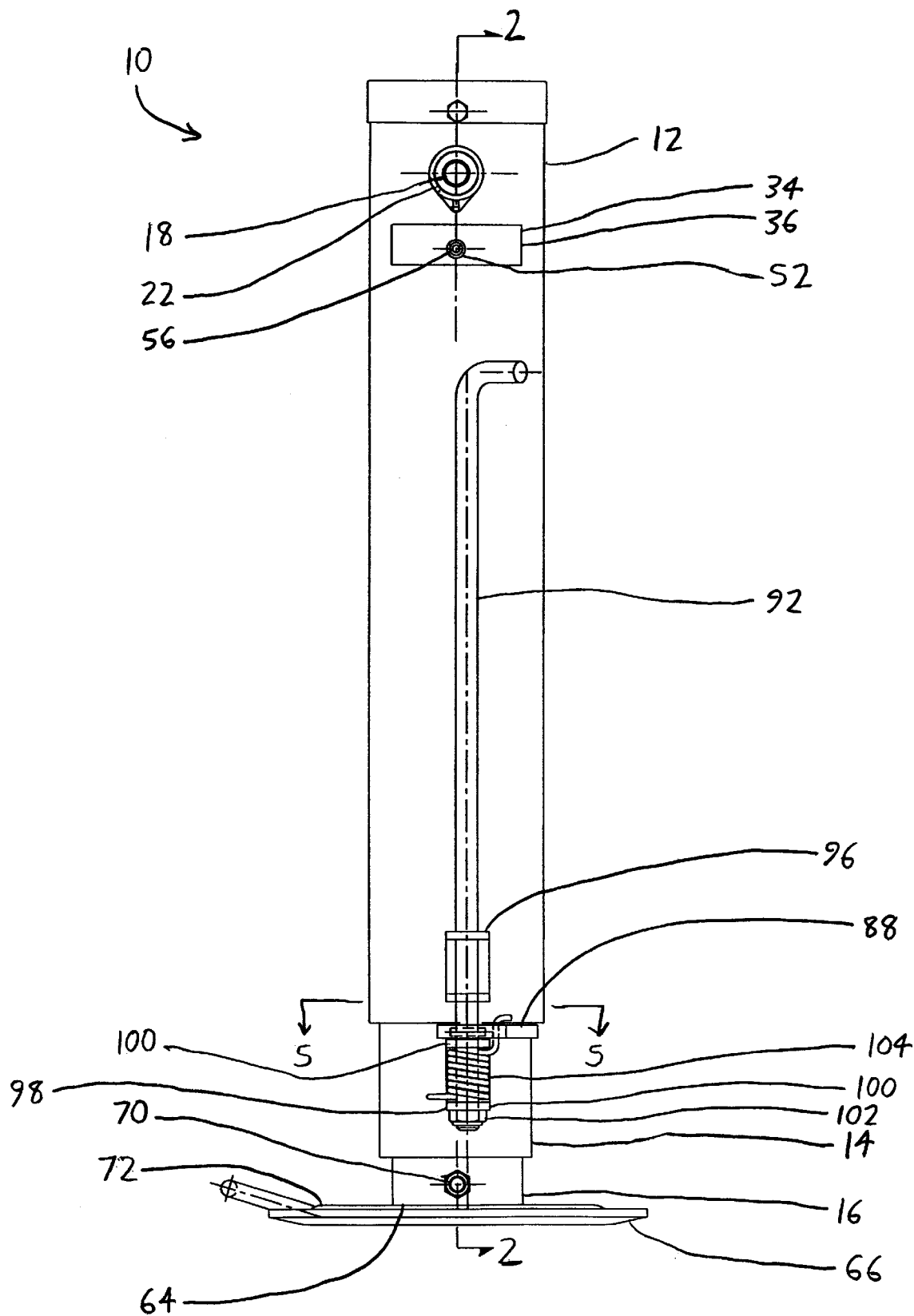
FIG. 1 is a front elevational view of the drop foot trailer jack of the present invention.

In the drawings, wherein the same or similar features of the invention are designated in all Figures with the same reference numerals, a drop foot trailer jack (vehicle landing gear) is illustrated in the Figures at the reference numeral 10. Referring particularly to FIGS. 1 and 2, the jack 10 includes an outer sleeve 12, an inner sleeve 14, and a drop foot 16, all of which are telescopically arrayed with respect to each other with the inner sleeve 14 and drop foot 16 being situated within the outer sleeve 12, and the drop foot 16 being situated within the inner sleeve 14. As will be discussed in greater detail below, the outer sleeve 12 bears a crank 18 (shown only in FIG. 2) which, when rotated, actuates a screw 20 rotatably affixed with respect to the outer sleeve 12 and rotationally and translationally engaging the inner sleeve 14. As a result, the inner sleeve 14 is axially repositioned with respect to the outer sleeve 12 when the screw 20 is rotated. The drop foot 16 is axially repositionable within the inner sleeve 14 (independently of the screw 20) so that the acting length of the jack 10 may be altered as desired. This variation in acting length is illustrated in FIGS. 3 and 4, wherein FIG. 3 illustrates the inner sleeve 14 fully extended with respect to the outer sleeve 12 with the drop foot 16 in a retracted state, and wherein FIG. 4 illustrates the inner sleeve 14 fully extended with respect to the outer sleeve 12 with the drop foot 16 in an extended state. The components of the jack 10 and their operation will now be described in greater detail.

With reference to FIGS. 1 and 2, the crank 18 extends through the outer sleeve 12 generally perpendicularly to the axis of the outer sleeve 12, and is borne therein by a pair of crank bearings 22 at the opposite sides of the outer sleeve 12. One end of the crank 18 bears a crank handle 24 (partially shown only in FIG. 2), which is preferably pivotally affixed to the crank 18 so that it may fold for easy storage. The crank handle 24 may take a variety of forms, e.g., those illustrated by U.S. Pat. No. 5,423,518 to Baxter, U.S. Pat. No. 5,904,342 to Laarman, or any other form wherein a radially-protruding member extends from the axis of the crank 18 to allow easier actuation of the crank 18 by a user.

A crank bevel gear 26 is then affixed on the crank 18 within the interior of the outer sleeve 12. To affix the crank bevel gear 26 on the crank 18, a hub extension of the crank bevel gear 26 is provided with a cross-hole which aligns with a cross-hole in the crank 18, and an interference-fit crank drive pin 28 is pressed through these holes to connect the crank 18 and the crank bevel gear 26.

The crank bevel gear 26 acts on a screw bevel gear 30 affixed atop the screw 20, whereby a rotation of the crank 18 will in turn cause the rotation of the screw 20. To connect the screw 20 and the screw bevel gear 30, the screw bevel gear 30 has a recessed slot in its base which captures a screw drive pin 32 fit within a cross-hole in the screw 20 so that rotation of the screw bevel gear 30 results in rotation of the screw 20.

A support plate 34 is inserted through the outer sleeve 12 to extend through the outer sleeve 12 in a direction substantially perpendicular to its axis. A support plate shoulder 36 is provided at one end of the support plate 34 to prevent further movement of the support plate 34 into the outer sleeve 12 once the shoulder 36 is encountered. The screw bevel gear 30 is then interposed between the support plate 34 and the crank bevel gear 26. Preferably, a thrust washer (not shown) is interposed between the support plate 34 and the screw bevel gear 30. Owing to the support plate shoulder 36 preventing inward motion of the support plate 34 on the outer sleeve 12, and the meshing of the crank bevel gear 26 against the screw bevel gear 30 preventing outward motion of the support plate 34, the support plate 34 is firmly maintained in place within the outer sleeve 12. Therefore, the screw 20 and screw bevel gear 30 are not subject to displacement (save for rotational motion) with respect to the outer sleeve 12.

A thrust bearing 38 is then located between the support plate 34 and a support washer 40, with the support washer 40 resting atop a machined shoulder in the screw 20. The thrust bearing 38 axially supports the load between the support plate 34 of the outer sleeve 12 and the inner sleeve 14 and drop foot 16, while at the same time allowing the screw 20 to rotate and thereby extend or retract the inner sleeve 14 with respect to the outer sleeve 12.

Within the inner sleeve 14, the screw 20 is engaged by a nut 42 having an outer circumferential ledge 44 situated atop the inner sleeve 14. Below and radially inwardly of the outer circumferential ledge 44, the nut 42 has an insertion portion 46 which fits closely within the inner sleeve 14. The nut 42 is thereby firmly retained atop the inner sleeve 14 when the jack 10 is in compression. Because the jack 10 may also be loaded in extension rather than in compression, a pair of nut retention pins 48 extend through holes 50 in the nut 42 and through the walls of the inner sleeve 14 (the holes in the inner sleeve 14 not being shown in the Figures) so that the nut 42 and inner sleeve 14 are maintained together. Thus, as previously noted, rotation of the crank 18 causes the crank bevel gear 26 to act against the screw bevel gear 30, thereby turning the screw 20 to act against the nut 42 and causing the outer sleeve 12 and inner sleeve 14 to axially move with respect to each other either in extension or retraction. It is noted that the cross-sectional areas of the outer sleeve 12, inner sleeve 14, and drop foot 16 are preferably polygonal so that when these components are telescopically collapsed and expanded, they cannot rotate with respect to each other; with reference to FIG. 5, it can be seen that the preferred version of the jack 10 has a square cross-section (though other shapes, such as round/tubular cross-sections, are also possible).

It is noted that the support plate 34 is specially configured to allow easy lubrication of the nut 42, gear train 26/30, thrust bearing 38, etc. by including a Zerk fitting 52—a fitting having a threaded or press-fit insertion end 54 and an opposing nipple end 56, and a passage leading therebetween with a check valve keeping the passage normally closed (with neither the passage nor the valve being illustrated in the Figures)—connected to cross-passages 58 in the support plate 34. By applying grease to the nipple end 56 of the Zerk fitting 52 at a pressure sufficient to defeat its check valve and allow the grease to pass through the insertion end 54, the grease will flow through the cross-passages 58 to lubricate the various parts within the jack 10. The top of the nut 42 has a depression 60 formed therein wherein grease may collect so as to maintain the mating surfaces between the nut 42 and screw 20 in a constantly lubricated state. Additionally, grease may flow upwardly to lubricate the gear train, i.e., the crank bevel gear 26 and screw bevel gear 30.

The drop foot 16 then extends between an upper drop foot end 62 and a lower drop foot end 64. At the lower drop foot end 64, a foot plate 66 is provided to provide a more stable base for the jack 10. The foot plate 66 bears a U-bracket 68 which is configured to be received in complementary fashion within the interior of the lower drop foot end 64, where it may be attached by means of a bolt 70. To increase the strength/rigidity of the foot plate 66, raised ridges 72 are formed therein.

Figure 6:
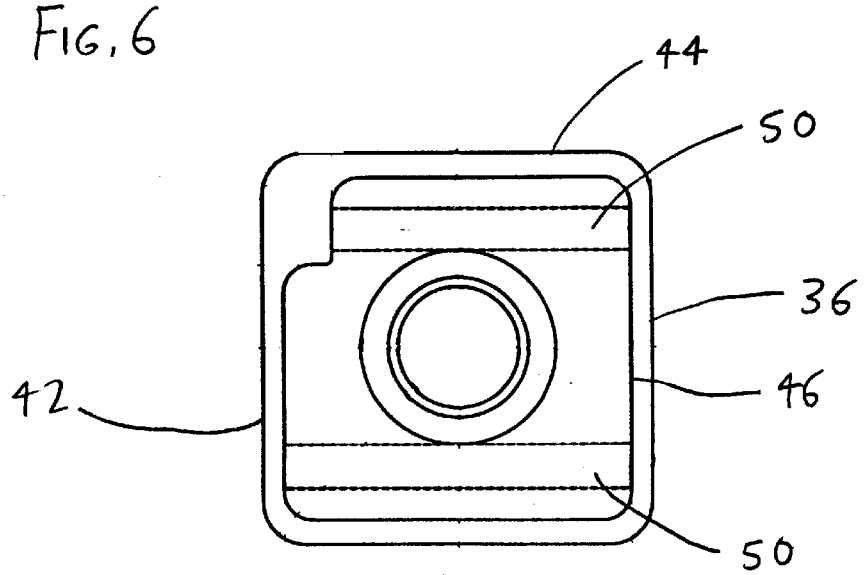
FIG. 6 is a bottom plan view of the nut 42 of the drop foot trailer jack of FIG. 1.

A spring 74 is affixed between the upper end of the inner sleeve 14 and the lower drop foot end 64 of the drop foot 16 so that the drop foot 16 is spring-biased toward a retracted position with respect to the inner sleeve 14. It is noted that in the Figures, the cross-sectional areas of the outer sleeve 12, inner sleeve 14, and drop foot 16 are polygonal (square); thus, the spring 74 does not interfere with the screw 20 (as it appears to do in FIG. 2), but rather it rests within one corner of the drop foot 16, away from the axially-situated screw 20. The spring 74 extends upwardly towards the nut 42, which (as illustrated in FIG. 6) has one corner of its insertion portion 46 cut away so that the spring 74 may extend upwardly adjacent to the insertion portion 46 and then have its upper spring end 76 bent over one of the nut retention pins 48 (as best seen in FIG. 2). Therefore, the upper spring end 76 is effectively anchored to the nut 42 at the upper end of the inner sleeve 14. The lower spring end 78 is connected to the lower drop foot end 64 by extending it within one or more apertures in the U-bracket 66 of the foot plate 66 and bending it to hook it to the U-bracket 66.

Apart from the support washer 40, other limiting means are provided for limiting the range of motion of the outer sleeve 12, inner sleeve 14, and drop foot 16 with respect to each other. As for the inner sleeve 14 and drop foot 16, two square holes are punched on opposing sides of each of the inner sleeve 14 and drop foot 16 (near the bottom of the inner sleeve 14 and the top of the drop foot 16), and guides 80 are then inserted into these holes. If the inner sleeve 14 and drop foot 16 are sufficiently extended with respect to each other, the guides 80 will interfere and prevent further extension; additionally, the guides 80 help to pilot the inner sleeve 14 within the drop foot 16. As for the outer sleeve 12 and the inner sleeve 14, the screw 20 has deformed threads 82 at its end 84 which limit the travel of the nut 42 on the screw 20.

Figure 5:
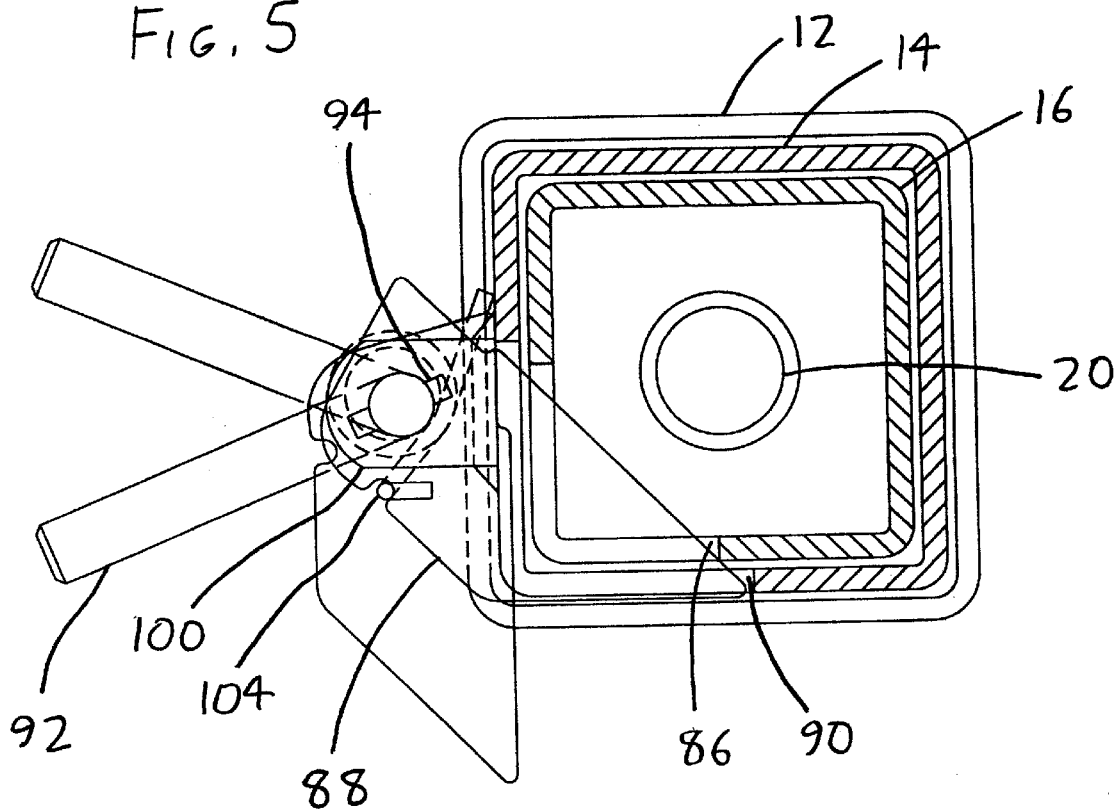
FIG. 5 is a top plan view of a section of the drop foot trailer jack of FIG. 1, shown from the plane 5—5 in FIG. 1.

As noted above with respect to FIGS. 3 and 4, the drop foot 16 may be extended by varying amounts with respect to the inner sleeve 14 to allow the height range of the jack 10 to be varied to different effective ranges. This is done by providing a series of drop foot latch apertures 86 in the drop foot 16, and then providing a latch 88 which is situated outside the inner sleeve 14 and which may be moved through an inner sleeve latch aperture 90 to be received within one of the drop foot latch apertures 86. With reference to FIGS. 1, 2, and 5, which particularly illustrate the preferred embodiment of the latch 88, the latch 88 may be actuated by a handle 92 extending axially upwardly along the exterior of the outer sleeve 12, and which is attached to the latch 88 by a drive pin 94 (shown in FIG. 5). The handle 92 may be rotated along its axis to pivot the latch 88 into and out of the drop foot latch aperture 86 and the inner sleeve latch aperture 90. The handle 92 is pivotally maintained along the length of the jack 10 by means of an outer sleeve handle bracket 96, and also an inner sleeve handle bracket 98 having opposing flanges 100. The inner sleeve handle bracket flanges 100 are spaced apart and are collectively situated on one side of the latch 88 opposite the outer sleeve handle bracket 96. The latch handle 92 is axially restrained from movement by situating the latch 88 against one of the inner sleeve handle bracket flanges 100 and affixing a lock nut 102 on a threaded end of the latch handle 92 so as to maintain the inner sleeve handle bracket flanges 100 between the latch 88 and the lock nut 102. As best seen in FIGS. 1 and 5, a torque spring 104 may then be situated between the inner sleeve handle bracket flanges 100 with one end engaging the latch 88 and the other bearing against the exterior of the inner sleeve 14, thereby rotatably biasing the latch 88 to insert within the inner sleeve latch aperture 90 and the drop foot latch apertures 86.

The configuration of the latch 88, best illustrated in FIG. 5, is particularly preferred for several reasons. Initially, the use of a planar latch 88, wherein the plane of the latch 88 is oriented generally perpendicularly to the axis of the jack 10, provides more area against which the inner sleeve 14 and drop foot 16 bear when the latch 88 is extended through their apertures 86 and 90. As a result, the latch 88 can support a high degree of shear stress. Second, the arrangement particularly illustrated in FIG. 5, wherein the plane of the latch 88 extends to engage more than one of the sides of the drop foot 16 and inner sleeve 14 when inserted therein, further enhances the shear load capacity of the latch 88 since a greater area of the inner sleeve 14 and drop foot 16 will bear against the latch. In addition, the latch 88 bearing against two sides of the inner sleeve 14 and drop foot 16 helps to prevent "canting," i.e., tipping owing to play between the outer sleeve 12, inner sleeve 14, and drop foot 16 causing these components to tilt with respect to each other when the latch 88 is inserted.

Thus, it can be seen that the effective working range of the jack can be varied from a fully retracted position illustrated in FIGS. 1 and 2 to the fully extended position illustrated in FIG. 4. To vary the working range of the jack, the user may rotate the latch handle 92 to disengage the latch 88 from the inner sleeve latch aperture 90 and the lowermost drop foot latch aperture 86. The user may then extend the drop foot 16 with respect to the inner sleeve 14, keeping the latch handle 92 rotated to avoid engagement of the latch 88. When the drop foot 16 is extended to the desired length, the latch handle 92 may be released so that the latch 88 will be spring-biased into the inner sleeve latch aperture 90 and also into the drop foot latch aperture 86 that it first encounters. The inner sleeve 14 and drop foot 16 will then be engaged with respect to each other. Rotation of the crank 18 then extends the outer sleeve 12 with respect to the inner sleeve 14. To collapse the jack 10, the reverse procedure is followed: the crank 18 is turned to retract the inner sleeve 14 within the outer sleeve 12, and the latch handle 92 is rotated to disengage the latch 88 from the inner sleeve latch aperture 90 and the drop foot latch aperture 86 in which it rests. It is noted that when the latch handle 92 is rotated in this fashion, the spring 74 loading the inner sleeve 14 with respect to the drop foot 16 will automatically cause the drop foot 16 to retract.

It is understood that a preferred embodiment of the invention is shown and described above to illustrate possible features of the invention, and numerous modifications could be made to the preferred embodiment. Therefore, the invention is not intended to be limited to the preferred embodiment described above, but rather is intended to be limited only by the claims set out below. Accordingly, the invention encompasses all alternate embodiments that fall literally or equivalently within the scope of these claims.

What is claimed is:

1. A drop foot jack comprising:
   a. an elongated outer sleeve having an exterior and an interior, a rotatable screw extending within at least a portion of its interior, and a lubrication passage extending between its exterior and its interior;
   b. an elongated inner sleeve telescopically received within the interior of the outer sleeve, the inner sleeve including a top surface wherein the screw is rotatably received, whereby rotation of the screw moves the outer sleeve and inner sleeve with respect to each other;
   and further wherein the top surface has a depression defined therein, the depression being situated adjacent the screw;
   wherein the lubrication passage allows lubricant injected from the exterior of the outer sleeve to access the depression, whereby lubricant may pool in the depression to maintain the screw in a lubricated state.

2. The drop foot jack of claim 1 wherein the lubrication passage has a one-way valve provided therein, the valve allowing the flow of lubricant from the exterior of the outer sleeve to its interior.

3. The drop foot jack of claim 1 wherein the lubrication passage terminates at a zerk fitting at the exterior of the outer sleeve.

4. The drop foot jack of claim 1 wherein the lubrication passage is provided within a support plate, the support plate being provided as an insert which extends from the exterior of the outer sleeve to its interior.

5. The drop foot jack of claim 1 further comprising an elongated drop foot telescopically received within the inner sleeve;
   wherein the inner sleeve includes an aperture situated along its length; and
   wherein the drop foot includes apertures spaced along its length;
   and further comprising a latch plate having a generally planar configuration which is situated generally perpendicular to the lengthwise axes of the inner sleeve and drop foot, the latch plate being movable into adjacently-aligned apertures on the inner sleeve and drop foot.

6. The drop foot jack of claim 1 further comprising an elongated drop foot having multiple discrete sides defined about its circumference, the drop foot being telescopically received within the inner sleeve;
   wherein the inner sleeve includes an aperture situated on its length; and
   wherein the drop foot includes apertures spaced along its length;
   and further comprising a latch which is selectively movable to extend into adjacently-aligned apertures on the inner sleeve and drop foot to engage at least two sides of the drop foot.

7. A drop foot jack comprising:
   a. an elongated inner sleeve having an interior and an exterior, the inner sleeve including an aperture situated along its length;
   b. an elongated drop foot telescopically received within the interior of the inner sleeve, the drop foot including apertures spaced along its length;
   and further comprising a latch plate having a generally planar configuration, the latch plate being movable into adjacently-aligned apertures on the inner sleeve and drop foot while being situated in planes generally perpendicular to the lengthwise axes of the inner sleeve and drop foot.

8. The drop foot jack of claim 7:
   wherein the inner sleeve has multiple discrete sides defined about its circumference and the drop sleeve has multiple discrete sides defined about its circumference, and
   wherein the latch plate, when moved into adjacently-aligned apertures on the inner sleeve and drop foot, engages at least two sides of the inner sleeve and at least two sides of the drop foot.

9. The drop foot jack of claim 7 wherein the apertures in the inner sleeve and drop foot each have a slot-like configuration into which the latch plate fits in complementary fashion.

10. The drop foot jack of claim 7 wherein the latch plate is spring-biased towards the drop foot.

11. The drop foot jack of claim 7 further comprising an elongated handle connected to the latch plate, the elongated handle extending at least substantially parallel to the inner sleeve outside the exterior of the inner sleeve.

12. The drop foot jack of claim 7 further comprising an elongated outer sleeve having an exterior and an interior, wherein the inner sleeve is telescopically received within the outer sleeve.

13. The drop footjack of claim 12 further comprising an elongated handle connected to the latch plate, the elongated handle being pivotally mounted to the inner sleeve and outer sleeve.

14. The drop foot jack of claim 12 wherein:
   a. the outer sleeve includes a rotatable screw extending within at least a portion of its interior, and
   b. the inner sleeve has a top surface wherein the screw is rotatably received, whereby rotation of the screw moves the outer sleeve and inner sleeve with respect to each other.

15. The drop foot jack of claim 14 wherein:
   a. the outer sleeve includes a lubrication passage extending between its exterior and its interior, and
   b. the top surface of the inner sleeve has a depression defined therein, the depression being situated adjacent the screw;
   wherein the lubrication passage allows lubricant injected from the exterior of the outer sleeve to access the depression, whereby lubricant may pool in the depression to maintain the screw in a lubricated state.

16. The drop foot jack of claim 15 wherein the lubrication passage terminates at a zerk fitting at the exterior of the outer sleeve.

17. A drop foot jack comprising:
   a. an elongated inner sleeve having multiple discrete sides defined about its circumference, wherein one of the sides includes an aperture defined therein;
   b. an elongated drop foot having multiple discrete sides defined about its circumference, wherein one of the sides includes apertures spaced along its length, and further wherein the drop foot is telescopically received within the inner sleeve; and
   c. a latch which is selectively movable to extend into adjacently-aligned apertures on the inner sleeve and drop foot to engage at least two sides of the drop foot,
   wherein the latch has a generally planar configuration, and wherein the plane of the latch is oriented generally perpendicular to the lengthwise axis of the inner sleeve.

18. The drop foot jack of claim 17 wherein the latch is spring-biased to move towards the drop foot.

19. The drop foot jack of claim 17:
   a. further comprising an elongated outer sleeve having an exterior and an interior, wherein
      (1) the outer sleeve telescopically receives the inner sleeve within its interior,
      (2) the outer sleeve includes a rotatable screw extending within at least a portion of its interior, and
      (3) the outer sleeve includes a lubrication passage extending between its exterior and its interior;
   b. and wherein
      (1) the inner sleeve includes a top surface wherein the screw is rotatably received, whereby rotation of the screw moves the outer sleeve and inner sleeve with respect to each other, and
      (2) the top surface of the inner sleeve has a depression defined therein, the depression being situated adjacent the screw;
   wherein the lubrication passage allows lubricant injected from the exterior of the outer sleeve to access the depression, whereby lubricant may pool in the depression to maintain the screw in a lubricated state.

20. The drop foot jack of claim 19 wherein the lubrication passage is provided within a support plate, the support plate being provided as an insert which extends from the exterior of the outer sleeve to its interior.

21. The drop foot jack of claim 5 wherein the inner sleeve and drop foot each have a polygonal cross-section whereby corners are spaced about their circumferences, and wherein:
   a. the aperture on the inner sleeve intersects a corner on the inner sleeve's circumference, and
   b. the apertures on the drop foot each intersect a corner on the drop foot's circumference.

22. The drop foot jack of claim 7 wherein the inner sleeve and drop foot each have a polygonal cross-section whereby corners are spaced about their circumferences, and wherein:
   a. the aperture on the inner sleeve intersects a corner on the inner sleeve's circumference, and
   b. the apertures on the drop foot each intersect a corner on the drop foot's circumference.

23. The drop foot jack of claim 17 wherein:
   a. the aperture of the inner sleeve is defined across at least two of its sides; and
   b. the apertures of the drop foot are each defined across at least two of its sides.

* * * * *